(12) United States Patent
Swathirajan et al.

(10) Patent No.: US 9,401,523 B2
(45) Date of Patent: Jul. 26, 2016

(54) FUEL CELL AND METHOD FOR REDUCING ELECTRODE DEGRADATION DURING STARTUP AND SHUTDOWN CYCLES

(75) Inventors: Swathy Swathirajan, West Bloomfield, MI (US); Belabbes Merzougui, East Windsor, CT (US); Paul Taichiang Yu, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2831 days.

(21) Appl. No.: 11/621,318

(22) Filed: Jan. 9, 2007

(65) Prior Publication Data

US 2008/0166599 A1 Jul. 10, 2008

(51) Int. Cl.
  H01M 4/86 (2006.01)
  H01M 8/04 (2006.01)
  H01M 8/10 (2016.01)
  H01M 4/92 (2006.01)

(52) U.S. Cl.
  CPC .......... *H01M 8/1004* (2013.01); *H01M 4/8605* (2013.01); *H01M 4/92* (2013.01); *H01M 4/926* (2013.01); *H01M 8/04223* (2013.01); *Y02E 60/521* (2013.01)

(58) Field of Classification Search
  None
  See application file for complete search history.

(56) References Cited

U.S. PATENT DOCUMENTS

| | | | |
|---|---|---|---|
| 3,134,697 A | 5/1964 | Niedrach | |
| 4,272,353 A | 6/1981 | Lawrance et al. | |
| 5,013,617 A | 5/1991 | Scheffler | |
| 5,045,414 A | 9/1991 | Bushnell et al. | |
| 5,211,984 A | 5/1993 | Wilson | |
| 5,272,017 A | 12/1993 | Swathirajan et al. | |
| 5,316,871 A | 5/1994 | Swathirajan et al. | |
| 5,569,520 A * | 10/1996 | Bates | 429/162 |
| 6,465,136 B1 * | 10/2002 | Fenton et al. | 429/309 |
| 6,514,635 B2 | 2/2003 | Van Dine et al. | |
| 6,521,381 B1 | 2/2003 | Vyas et al. | |
| 6,649,299 B2 * | 11/2003 | Appleby et al. | 429/452 |
| 6,855,453 B2 | 2/2005 | Bett et al. | |
| 6,858,336 B2 * | 2/2005 | Reiser et al. | 429/13 |
| 7,678,477 B2 | 3/2010 | Yu | |
| 7,799,475 B2 | 9/2010 | Yu et al. | |
| 2001/0031389 A1 | 10/2001 | Appleby et al. | |
| 2002/0076583 A1 | 6/2002 | Reiser et al. | |
| 2002/0102443 A1 | 8/2002 | Yang et al. | |
| 2003/0129462 A1 * | 7/2003 | Yang et al. | 429/17 |
| 2003/0134164 A1 | 7/2003 | Reiser et al. | |

(Continued)

FOREIGN PATENT DOCUMENTS

| | | |
|---|---|---|
| JP | 2000277123 A | 10/2000 |
| JP | 2004172105 A | 6/2004 |

(Continued)

OTHER PUBLICATIONS

Landsman et al., "Catalyst Studies and Coating Technologies"; Handbook of Fuel Cells, Chapter 67, vol. 3, 2003, 22 pages.

(Continued)

*Primary Examiner* — Colin W Slifka
(74) *Attorney, Agent, or Firm* — BrooksGroup

(57) ABSTRACT

One embodiment of the invention includes a product comprising: a membrane electrolyte having a first face and a second face; and an anode over the first face and a cathode over the second face, and wherein the anode has a catalyst loading that is less than 50% of the catalyst loading of the cathode.

14 Claims, 7 Drawing Sheets

(56) References Cited

U.S. PATENT DOCUMENTS

| | | | |
|---|---|---|---|
| 2003/0134165 A1 | 7/2003 | Reiser et al. | |
| 2005/0245390 A1 | 11/2005 | Ota et al. | |
| 2006/0046106 A1* | 3/2006 | Yu et al. | 429/13 |
| 2007/0292744 A1* | 12/2007 | Lopez et al. | 429/44 |
| 2008/0063915 A1* | 3/2008 | Yamamoto | 429/30 |
| 2009/0029216 A1 | 1/2009 | Yamamoto | |
| 2010/0112382 A1 | 5/2010 | Hochgraf et al. | |

FOREIGN PATENT DOCUMENTS

| | | | |
|---|---|---|---|
| JP | 2004206898 A | 7/2004 | |
| JP | 2006085984 A | 3/2006 | |
| JP | 2006507647 A | 3/2006 | |
| JP | 2006244907 A | 9/2006 | |
| JP | 2006351270 A | 12/2006 | |
| WO | 9713287 | 4/1997 | |
| WO | 2005106994 A1 | 11/2005 | |
| WO | WO 2005106994 A1 * | 11/2005 | |
| WO | 2006088194 A1 | 8/2006 | |

OTHER PUBLICATIONS

Reiser et al., "A Reverse-Current Decay Mechanism for Fuel Cells"; Electrochemical and Solid-State Letters, 8 (6) A273-A276 (2005).

German Office Action DE 10 2008 003 197.6, "Fuel Cell and Method for Reducing Electrode Degradation During Startup and Shutdown Cycles"; dated Apr. 14, 2011; 7 pages.

Translation of Japanese Office Action JP 2007-340346, dated May 30, 2011, 4 pages.

Japanese Office Action dated Mar. 29, 2012; Applicant SN 2007-340436; Applicant: GM Global Technology Operations LLC; 9 pages.

Japanese Office Action dated Dec. 17, 2013; Applicant: GM Global Technology Operations LLC; Application No. 2012-279586; 4 pages.

* cited by examiner

FUEL CELL AND METHOD FOR REDUCING ELECTRODE DEGRADATION DURING STARTUP AND SHUTDOWN CYCLES

TECHNICAL FIELD

The disclosure generally relates to fuel cells and processes of starting up and shutting down a fuel cell.

BACKGROUND

Fuel cells that are not properly shut down or started up can suffer considerable electrode degradation due to carbon corrosion and loss of catalyst surface area. One simple and inexpensive way to shut down a fuel cell is to purge out fuel gas in the anode flow field. When air is used to purge the fuel gas in the anode flow field, there are air rich region and hydrogen rich region in the anode flow field during such change-over until fuel gas is completely displaced. As a result, a local electrochemical cell is created in the anode section involving hydrogen oxidation in the hydrogen rich region and oxygen reduction in the oxygen rich region. Such local cell formation causes proton ion migration in the electrolyte layer between the two regions of the anode by an indirect path mediated by the cathode. The local cell on the anode thus triggers formation of another local cell across the corresponding regions on the cathode, involving oxygen reduction and carbon oxidation. Such local cell formation and its corresponding electrochemical reactions are illustrated in FIG. 1. Local cell formation causes the potential of the cathode to shift up by as much as 0.6-0.8 volt to as high as 1.6-1.8 V (RHE). It is believed that the oxygen reduction reaction on the anode and carbon oxidation reaction on the cathode are responsible for catalyst surface area loss and carbon corrosion. Loss of catalyst activity and support material corrosion are two important forms of electrode degradation in fuel cell during startup and shutdown. A fuel cell capable of otherwise operating continuously for long period of time can lose significant amount of its power after limited number of startup/shutdown cycles due to electrode degradation.

The use of an inert gas such as nitrogen and the use of an auxiliary load to reduce the cathode potential shift are disclosed in U.S. Pat. Nos. 5,013,617 and 5,045,414. Since fuel cells are subject to numerous start-up/shut down cycles, use of an inert gas is not practical or economical due to additional inert gas supply and connection requirements. Use of air purge during shut-down is disclosed in US Patent Application Publication US 2003/0134164. A hydrogen fuel purge method during start-up was disclosed in US patent Application Publication US 2003/0134165. The use of an anode exhaust recycle loop was disclosed in U.S. Pat. No. 6,514,635. None of the above processes offer instantaneous and complete fuel gas replacement over the entire electrode. The co-existence of hydrogen-rich and oxygen-rich regions is still created in the startup and shutdown cycles. Local cell formation and electrode degradation still occur.

Modifications of catalysts on anode and cathode are disclosed to mitigate the electrode degradation problems during startup and shutdown in U.S. Pat. No. 6,855,453. Such modifications can reduce, but not completely prevent, the degradation caused by local cells. Catalyst modification, however, usually adds cost and may adversely affect the fuel cell operation efficiency.

Additionally, oxygen cross-over from cathode to anode can cause hydrogen starvation and local cell formation, resulting in significant electrode degradation in a similar manner. There is a need to dramatically reduce fuel cell electrode degradation using an inexpensive and practical approach.

SUMMARY OF EXEMPLARY EMBODIMENTS OF THE INVENTION

In one embodiment of the invention, a fuel cell exhibiting minimal electrode degradation after numerous startup and shutdown cycles is provided. The fuel cell comprises an anode having a very low oxygen reduction activity and capacity, a low capacity for surface processes, and a thin anode profile for fast exchange of fuel and oxidant gases, and for a low oxygen storage capacity.

In another embodiment of the invention, a method of minimizing cathode potential shift during startup and shutdown to control electrode degradation comprises: constructing a fuel cell having an anode with low capacities for storing and reducing oxygen and other surface species by using a thin anode profile and suitable material design, and a cathode having higher catalyst loading and thickness; rapidly flowing an oxidant gas through the anode to replace fuel gas during shutdown, and rapidly flowing a fuel gas to displace the oxidant gas in the anode section during startup.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Figure 1:
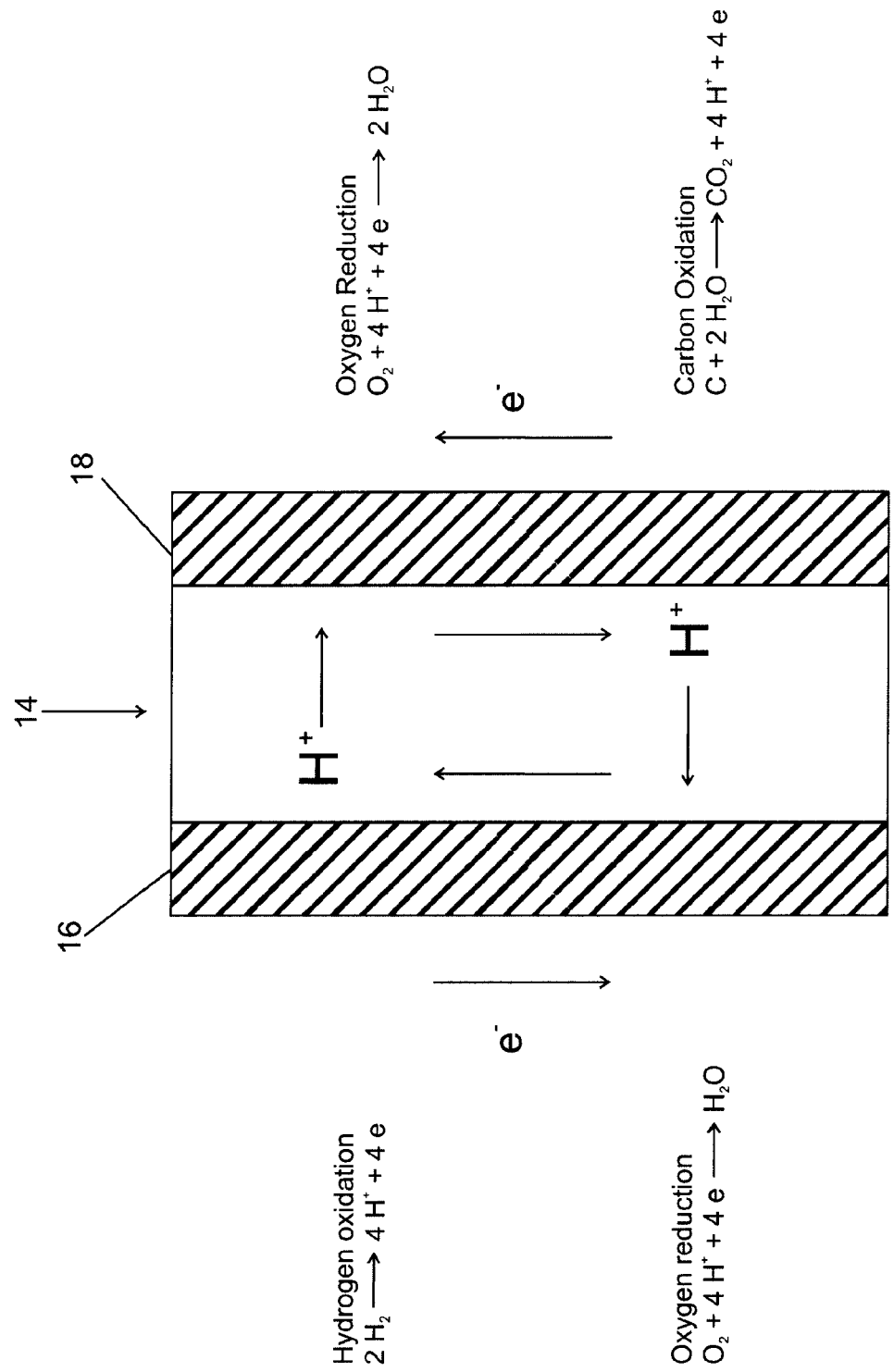
FIG. 1 is a schematic view of an electrochemical fuel cell and local cells formed on both the anode and the cathode during startup and shutdown cycles.
Figure 2:
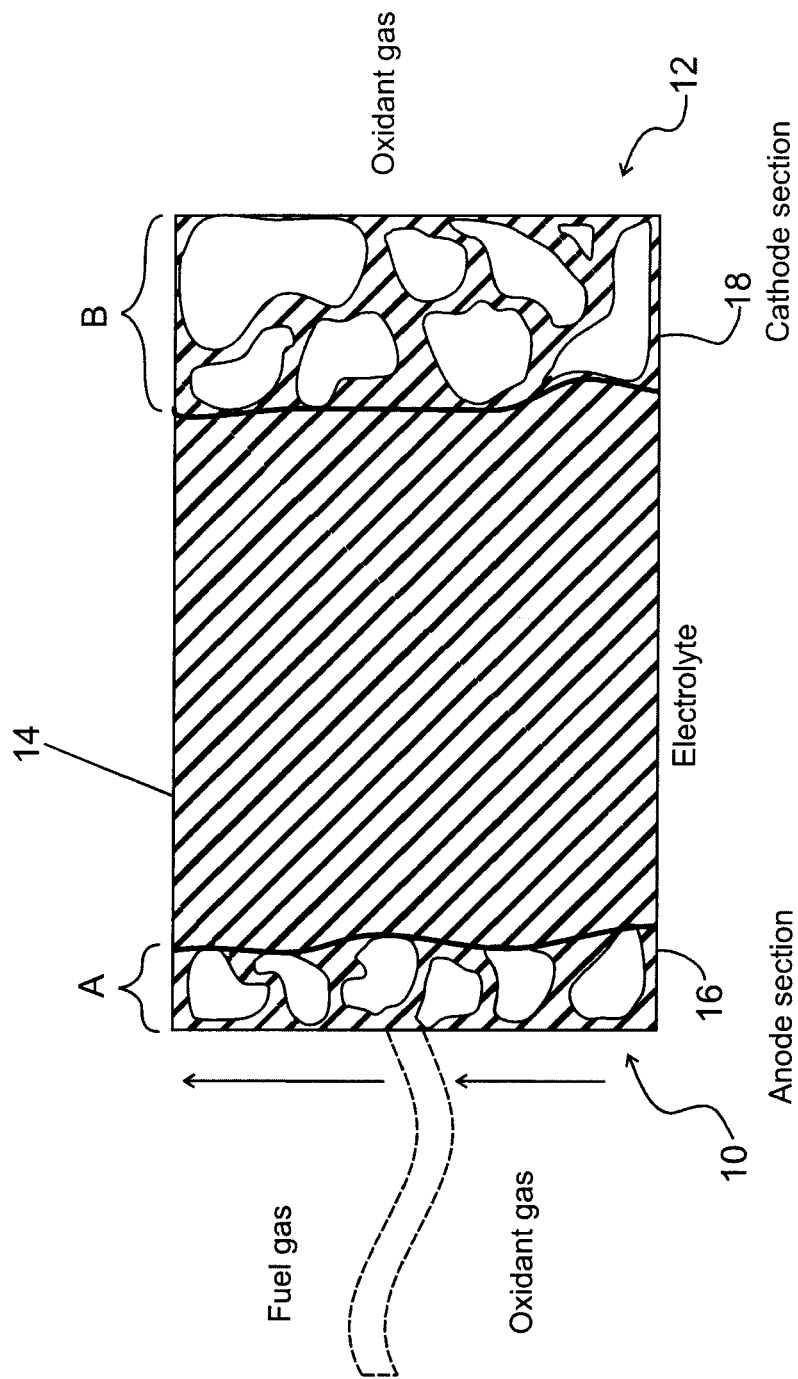
FIG. 2 is a pictorial illustration of a cross-section of a membrane electrode assembly using platinized carbon as a construction material for anode during shutdown process according to one embodiment of the invention.
Figure 3:
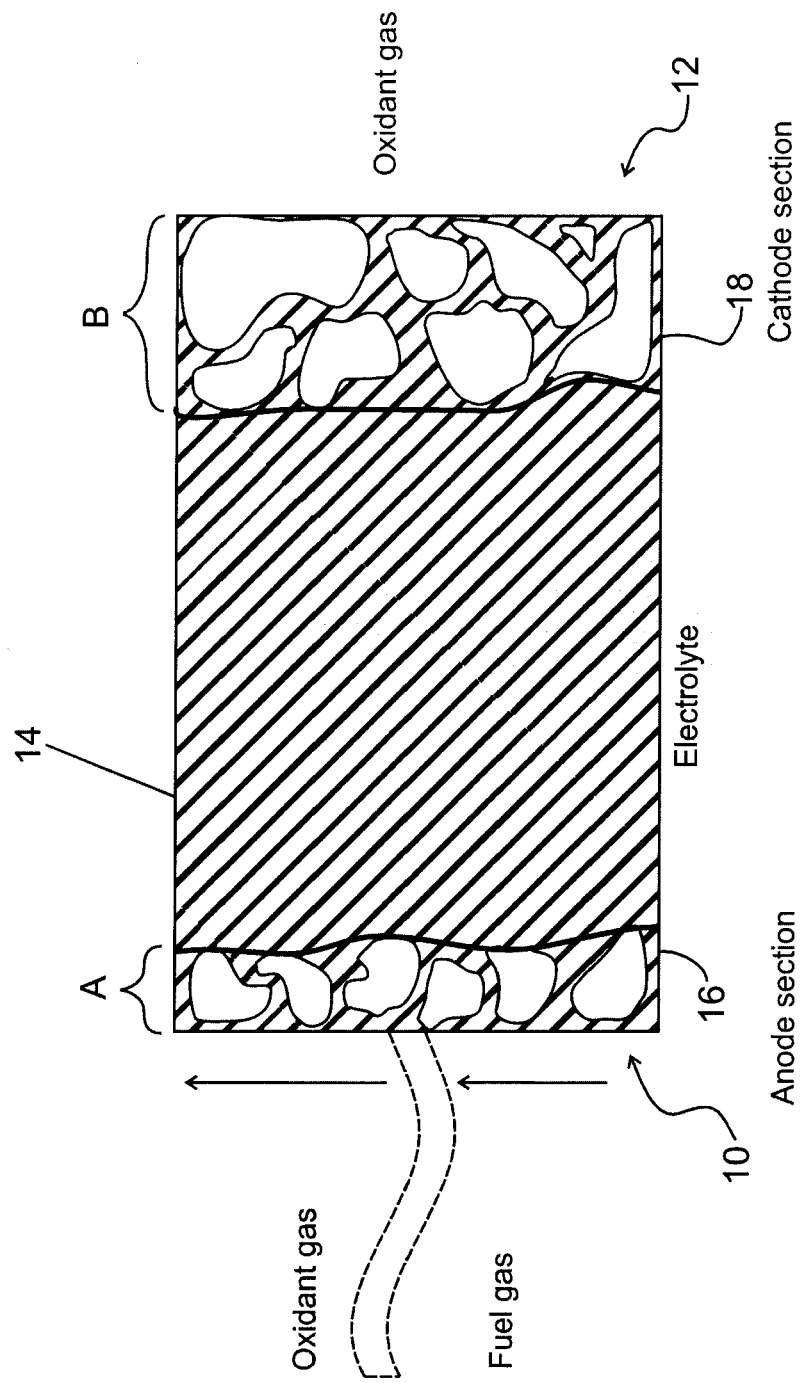
FIG. 3 is a pictorial illustration of a membrane electrode assembly as in FIG. 2, during startup process.
Figure 4:
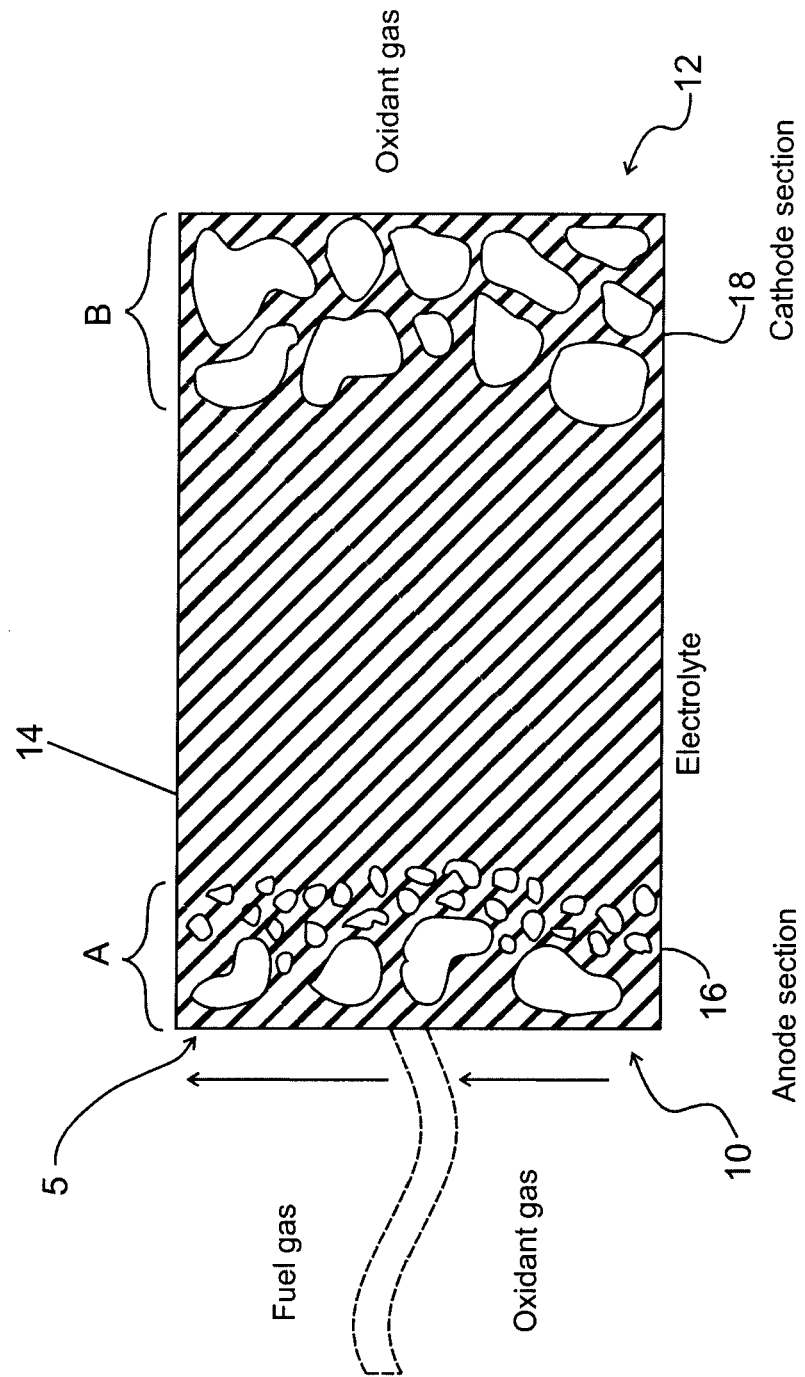
FIG. 4 is a pictorial illustration of a cross-section of a membrane electrode assembly during startup process according to one embodiment of the invention, wherein the anode catalyst is vapor deposited directly.
Figure 5:
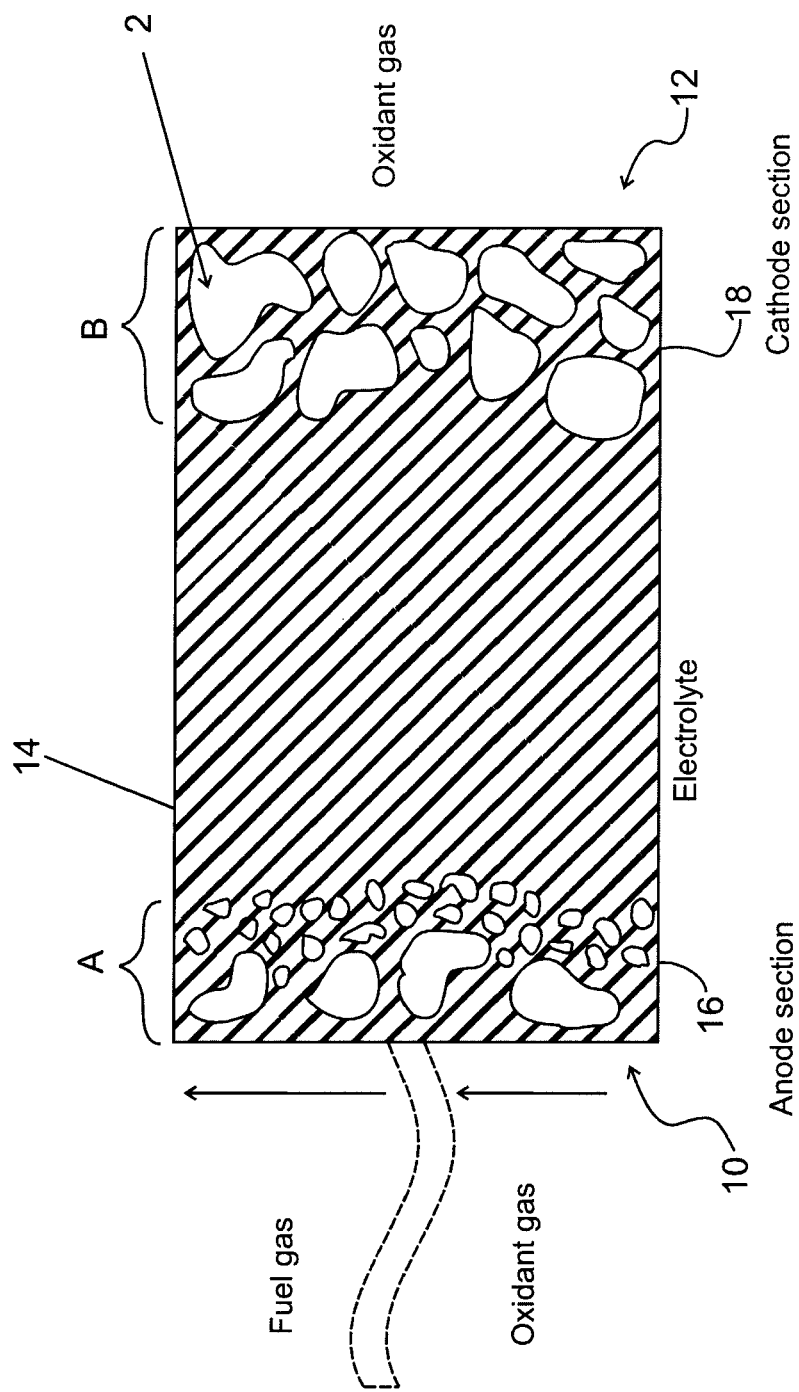
FIG. 5 is a pictorial illustration of the same fuel membrane electrode assembly of FIG. 4 during shutdown process.

The following description of the embodiment(s) is merely exemplary in nature and is in no way intended to limit the claimed invention, its application, or uses.

As illustrated in FIG. 2-5, the electrochemical cell includes an anode section 10, a cathode section 12, and a membrane electrolyte 14 that separate the anode and cathode sections. The membrane electrolyte 14 also provides ionically conductive connection between the anode 10 and cathode 12. The anode section 10 includes an anode 16 having a thickness A and a flow field for a fuel gas having contact with at least part of the anode surface in a normal operation. The cathode section 12 includes a cathode 18 having a thickness B and a flow field for an oxidant gas having contact with at least part of the cathode surface in a normal operation. Both anode 16 and cathode 18 comprise a catalyst and a catalyst support.

In one embodiment, the fuel cell comprises an anode having very low capacity for oxygen reduction and storage, and for surface processes. In exemplary embodiments, the anode 16 is characterized as having a carbon support with low surface area, a very low catalyst loading, a low catalyst specific area, and a thin profile. The role of these parameters can be illustrated by the following phenomenological analysis of the charge that flows during the start up and shut down process. If Q is the total cathodic charge generated by local cell action that must be minimized to reduce electrode degradation, $$Q = Q_{nf} + Q_f \quad (1)$$

where $Q_{nf}$ is the non-faradaic charge (due to surface processes, e.g., adsorption of OH on Pt, double layer charging of catalyst and support, etc.); and $Q_f$ is the charge due to oxygen reduction reaction at the anode that depends on the oxygen reduction capacity of the electrode. Defining S as the total electrode specific surface area (catalyst and support), $S_{HAD}$ as the hydrogen adsorption (HAD) area on Pt (expressed as $cm^2/mg_{Pt}$), $q_s$ as the charge density per unit electrode specific area ($\mu C/cm^2_s$) due to surface processes, L as the total anode catalyst (Pt) loading, $mg_{Pt}$, and $\tau$ as the transition time for the oxygen concentration in the anode to decrease to zero (that depends on the oxygen storage capacity), Eqn (1) can be written as:

$$Q = Sq_s + S_{HAD}L \int_0^\tau i_{cS}(E, t)dt \quad (2)$$

where $i_{cs}$ is the specific cathodic current density ($\mu A/cm^2_{Pt}$) that is time and potential dependent during the transient period. Lumped parameters are used for the sake of simplicity. A decrease in the Pt loading wt % will decrease L and also decrease $i_{cs}$. A decrease in the BET area of the catalyst support will decrease S, $S_{HAD}$, and the oxygen storage capacity that will decrease the transition time $\tau$. Finally, a decrease in the electrode thickness will reduce the oxygen storage capacity to decrease $\tau$, reduce the Pt loading L and also reduce the total electrode area S. The cathode 18 of the fuel cell, on the other hand, is characterized as having a carbon support with a high surface area, a greater electrode thickness, and a higher catalyst loading. The fuel cell having such anode 16 and cathode 18 characteristics exhibits very low propensity for large cathode potential shift during startup and shutdown cycles, while maintaining high operation current density. Additionally, the thin profile of anode section allows very fast and complete fuel gas and oxidant gas exchange. A very fast purge can therefore be achieved on the anode side to effectively reduce the duration of cathode potential shift due to local cell formation. The fuel cell can withstand hundreds, even thousands of startup and shutdown cycles without significant degradation of its electrodes.

The anode of the fuel cell may include at least a catalyst and catalyst support. The catalyst provides sufficiently high activity and reaction rate of fuel gas oxidation. Although the catalyst is preferably platinum metal, the alloy and mixtures of platinum with other metals such as iridium, rhodium, palladium, rhenium, ruthenium, gold, silver, nickel, cobalt, chromium, titanium, tungsten and silicon may also be used. Platinum metal alloys or metal mixture may help reduce the oxygen reduction activity and capacity of the anode. The catalyst support is an inert electric conductor having relative small surface area <250 $m^2/g$. In exemplary embodiment, the catalyst support comprises a carbon having BET (Brunaer, Emmett, Teller) surface area of about 20 to about 150 $m^2/g$, using preferably a graphitized carbon. Examples of such low surface area carbon include acetylene black with a surface area of 64-70 $m^2/g$, graphitized Vulcan with a surface area of about 80 $m^2/g$ and graphite support with a surface area of about 20 $m^2/g$. The carbon is preferably in particulate form, having a particle size of about 0.02 to 0.3 $\mu m$. Small particle size in such range allows fabrication of a very thin and yet fully functional anode. The catalyst support also has limited internal pore and pore size distribution.

The anode catalyst can be applied to the catalyst support first to form so-called platinized carbon before integrated into an anode on one side of a membrane electrolyte. The catalyst can be, for example, dispersed onto a carbon support by precipitation from a solution containing a catalyst precursor with a suitable reducing agent. One of such methods is exemplified in a commonly owned U.S. Pat. No. 5,272,017. The catalyst can also be deposited after the catalyst support is applied to a carbon sheet current collector. The catalyst, for example, can be applied to such electrode assembly by a vapor deposition method, such as sputtering, chemical vapor deposition, plasma vapor deposition, laser ablation, and the like. One such method is exemplified in a commonly owned U.S. Pat. No. 6,521,381. The catalyst loading on the anode can range from about 0.002 $mg/cm^2$ to about 0.1 $mg/cm^2$, about 0.01 to about 0.05 $mg/cm^2$, about 0.02 to 0.07 $mg/cm^2$, or ranges there between. The anode catalyst loading may be less than 50%, 40%, 35%, 30%, 25%, 20%, 15% or 10% by weight of the catalyst loading of the cathode. In one embodiment where platinized carbon is used on the anode, the catalyst loading on such carbon support can range from about 1% by weight to about 50%, from 10% to about 40% by weight, from 10% by weight of support and catalyst to about 20%, or ranges there between. Platinum loading at such low level on the anode provides surprisingly sufficient current density (1.5 A/cm2 @ 0.5 V for hydrogen/air at 80 C, 66% RH and 150 kPa pressure) while dramatically suppressing the oxygen reduction activity and capacity on the anode and potential shift on the cathode during startup and shutdown cycles. The specific surface area of anode catalyst can be lowered by depositing the catalyst on a low BET area support. Thus, deposition of 50 wt. % Pt on graphitized carbon and reducing the electrode thickness can lead to a lower anode surface area, as shown in Table 1.

The anode of the fuel cell is made to have a very thin profile to facilitate fast gas exchange and obtain low oxygen storage and reduction capacities. The thin profile may include characteristics such as thin electrode thickness, relatively low electrode porosity, low anode flow field volume to anode surface ratio, The anode thickness can be reduced to about 1.5 to 5 $\mu m$, about 1 to 10 $\mu m$, or to about 2 to about 5 $\mu m$, by reducing catalyst loading to about 0.01 to 0.07 $mg/cm^2$, selecting carbon support having a particle size of 0.02 to 0.1 $\mu m$, and by reducing the amount of catalyst support per unit area to 0.05 to 1 $mg/cm^2$. Additionally, low anode flow field volume to anode surface area ratio can significantly reduce the gas purging time, increase the purging efficiency, and thus reduce the duration of cathode potential shift and possible electrode degradation. The anode ratio of flow field volume to anode electrode area ratio can range from 0.01 cm to 0.06 cm, and preferably 0.03 cm to 0.05 cm.

The oxygen reduction capacity and activity of the anode may be further reduced by lowering the specific catalyst activity for the oxygen reduction reaction (ORR), without decreasing the current density of the fuel cell. ORR specific activity is usually measured at 0.9 V (RHE) either using a thin film rotating disk electrode or a membrane/electrode assembly. It has a typical value of 200 $\mu A/cm^2_{Pt}$ when Pt is dispersed on amorphous carbon with a loading of 40-50 wt. %, and below 100 $\mu A/cm^2_{Pt}$ when Pt loading is below 25 wt. % or if Pt is dispersed on graphitized carbon.

In contrast to the anode composition and design, the cathode may have higher catalyst loading, greater thickness, and high surface area catalyst support.

Cathode catalyst may comprise platinum metal, metal alloys or metal mixtures. Metal alloys and mixtures can be formed by combining two or more of the following exemplary list of metals: platinum, iridium, rhodium, palladium, rhenium, ruthenium, gold, silver, and nickel. In one embodiment, the catalyst loading on the cathode ranges from about 0.1 mg/cm² to about 0.4 mg/cm². In another embodiment, the catalyst loading on the cathode ranges from about 0.15 to about 0.3 mg/cm².

In one embodiment of the invention, the cathode thickness of the fuel cell may range from about 10 µm to about 15 µm. In one embodiment, the cathode thickness is chosen to be at least twice the thickness of the corresponding anode thickness. Such thickness can be controlled by using proper amount of catalyst loading, carbon support, and BET area of the carbon support. In one embodiment, the loading of the carbon support may be between 40-70% by weight.

The cathode comprises a catalyst support having high surface area. The BET surface area of the cathode can range from 100 m²/g to about 3,000 m²/g, preferably from 100 to 1,000 m²/g. The cathode support may also have an optimum pore distribution with predominantly mesopores (80-90%). In one embodiment, Ketjen black with a BET surface area of 900-950 m²/g is used as the catalyst support for the cathode. The catalyst can be applied to the catalyst support using various methods known to an ordinary skill in the art. Ketjen black, for example, can be platinized by dispersing suitable amount of platinum on the carbon particle or by the Prototech process as supplied by E-tek Company. To deposit Pt nanoparticles, the carbon support may be dispersed in an aqueous solution of a platinum precursor such as chloroplatinic acid and the platinum ions are reduced to the metallic state using a reducing agent such as hydrazine.

The membrane electrolyte is also referred to as the solid polymer electrolyte (SPE) membrane. The electrolyte may be a well known ion conductive material. Such SPE membranes are also referred to as proton exchange membranes (PEM). Typical SPE membranes are described in U.S. Pat. Nos. 4,272,353; 3,134,697 and 5,211,984.

The membrane electrolyte may be an ion exchange resin membrane. The ion exchange resin may include ionic groups in its polymeric structure; one ionic component of which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cation exchange, proton conductive resins is the so-called sulfonic acid cation exchange resin. In the sulfonic acid membranes, the cation ion exchange groups are hydrated sulfonic acid radicals which are attached to the polymer backbone by sulfonation.

The formation of these ion exchange resins into membranes or sheets is also well known in the art. The preferred type is perfluorinated sulfonic acid polymer electrolyte in which the entire membrane structure has ion exchange characteristics. These membranes are commercially available, and a typical example of a commercial sulfonated perfluorocarbon, proton conductive membrane is sold by E.I. Dupont de Nemours & Co., under the trade designation NAFION™. Another was developed by Dow Chemical. Such proton conductive membranes may be characterized by monomers of the structures $CF_2=CFOCF_2CF_2SO_3H$, $CF_2=CFOCF_2CF(CF_3)OCF_2SO_3H$, and $—CF_2CF_2CF(ORX)CF_2CF_2—$, where x is $SO_3H$ or $CO_2H$. NAFION™ is a fluoropolymer, and more specifically, a copolymer which comprises perfluorinated carboxylic or sulfonic acid monomeric units. NAFION™ polymers and polymer membranes are prepared from copolymerization of tetrafluoroethylene and perfluorinated monomers containing sulfonic or carboxylic acid groups. The perfluorinated sulfonic copolymer is preferred for the invention.

In the electrochemical fuel cell, the membrane 14 may be a cation permeable, proton conductive membrane, having H⁺ ions as the mobile ion; the fuel gas is hydrogen containing fuels such as methanol, hydrogen gas, or gas mixtures containing methanol or hydrogen. The oxidant gas is oxygen or oxygen containing gas such as air. The overall cell reaction is the oxidation of hydrogen to water and the respective reactions at the anode and cathode, are $H_2=2H^++2e$ (anode) and $\frac{1}{2}O_2+2H^++2e=H_2O$ (cathode).

In various embodiments, the thickness of the membrane electrolyte may range from about 10 to about 200 µm thick, and preferable from about 20 to about 100 µm thick. Thicker membranes will help reduce local cell action that causes electrode degradation, but the fuel cell performance may decrease appreciably.

When hydrogen is used as the fuel gas, the product of the overall cell reaction is water. Typically, the product water is rejected at the cathode which is the electrode on the oxygen or air side. Typically, water then escapes by simple flow or by evaporation. However, means may be provided if desired, for collecting the water as it is formed and carrying it away from the cell to prevent so-called electrode flooding. Water management in the cell may allow for the successful long-term operation of the electrochemical fuel cell. Water management techniques and cell designs related thereto are described in U.S. Pat. No. 5,272,017 and U.S. Pat. No. 5,316,871. Control of oxidant gas humidity level, self-humidification setup, gas flow rate adjustment, and careful control of operating temperature may be used in water management.

A single unit of the fuel cell can be made by forming so called membrane electrode assembly (MEA) as described in commonly owned U.S. Pat. No. 5,272,017 and U.S. Pat. No. 6,521,381. Such membrane electrode assembly can then be stacked together through an interconnect called bipolar plate as described in the reference, D. A. Landsman and F. J. Luczak, "Handbook of Fuel cells", John Wiley and sons (2003). Bipolar plates provide sufficient electric conductivity between neighboring units of membrane electrode assemblies. Each of the bipolar plates also has plurality of cathode and anode flow channels which separately define the flow fields of the anode and cathode sections. The cathode channels define the flow field for oxidant gas such as air to flow over the cathode from an inlet to an outlet. Similarly the anode channels define the flow field for fuel gas such as hydrogen to flow over the anode from an inlet to an outlet. The flow channels can be formed by stamping, etching, mold casting, carving or other methods known to an ordinary skill in the art. In one embodiment, the anode flow channels are made such that the ratio of flow field volume in the anode section to the geometric anode surface area exposed to the flow field is about 0.01 cm to 0.06 cm.

Each of the cells described above may also include a cooler adjacent the flow field plate for removing heat from the cell, a radiator for rejecting the heat, and a flow control valve or orifice.

During normal operation, a fuel gas, such as pure hydrogen, is supplied to the anode flow field continuously from a hydrogen source. The fuel gas may be heated to certain temperature before entering the fuel cell. The fuel gas may also be humidified for controlling the hydration level in the membrane electrolyte. An oxidant gas, such as air, is continuously supplied to the cathode flow field. The oxidant gas may be heated to a certain temperature before entering the cathode flow field. The humidity of the oxidant gas and rate of flow may be controlled to ensure proper hydration level of the membrane electrolyte and to prevent water condensation on the cathode to cause undesirable electrode flooding. Water condensed from the exhaust of the fuel cell may be used to provide extra humidity to the incoming fuel gas and/or oxidant gas especially for fuel cells operating at high current density and high temperatures.

To shut down the fuel cell, depending on the pressure of fuel gas in the anode section, one may optionally reduce the fuel gas pressure to slightly above ambient pressure. Such step will initially decrease the fuel gas concentration in the anode section, but the pressure is still high enough to prevent air from entering the anode section. At this point, the primary load of fuel may also be optionally disconnected, and an auxiliary load may be optionally connected to reduce the voltage of the fuel electrode and the cathode potential. Oxidant gas, such as air, is then quickly introduced to the anode section at elevated pressure. During this air purge, the air/$H_2$ front residence time is reduced to less than 0.5 second, and preferably to as low as 0.05 second, to completely displace the hydrogen in the anode flow field. The front residence time is defined as anode flow field volume divided by purge gas flow rate. The applicant has found that anodes with conventional thickness, regular catalyst loading level, and significant depth of porous diffusion layer retain significant amount of fuel gas and/or an oxide layer even in such fast air purge process. The residue fuel gas and oxide layer in the anode can extend the duration and magnitude of cathode potential shift and cause electrode degradation. In one embodiment of the invention, the anode section has a very thin profile including a thin anode layer, a low catalyst loading, and a small ratio of flow field volume to anode surface area. The thin anode profile allows very efficient displacement of all hydrogen within a very short period of time. As a result, the duration and magnitude of cathode potential shift during such shutdown process is greatly reduced.

A dummy electrical load may be used to bring the cathode potential down rapidly at the beginning of the purges. Once the cathode potential is down, the dummy electrical load typically would no longer be required.

During the shutdown process, the oxidant gas flow to the cathode may also be adjusted accordingly. The cathode air flow is stopped while fuel gas is still above ambient pressure and partial pressure of oxygen in the cathode flow field is reduced to ambient conditions at open circuit potential to avoid oxygen cross-over to the anode. The stack is then connected to a dummy load to reduce the cathode potential to less than 0.2 V while the anode is still filled with fuel gas. Then hydrogen is quickly purged out of the anode with air as cathode potential is still held below 0.2 V by the dummy load.

In its startup process, the fuel cell is disconnected from any external load and connected to a dummy load. Fuel gas supply is quickly connected to the anode flow field while the cathode is filled with stagnant air and the stack is connected to a dummy load. Depending on the pressure of the fuel gas supply, a pressure booster may be used to raise the fuel pressure and to increase the flow rate of the fuel gas. The air inside the anode flow field is thus quickly replaced by the fuel gas. When the hydrogen/air front has passed thorough the anode thoroughly, the stack is disconnected from the dummy load and oxidant gas flow is initiated to the cathode flow field. To avoid oxidant gas cross-over from the cathode to the anode, the oxidant gas on the cathode side may be initially set at lower pressure than the purging fuel gas pressure. The stack is now at open-circuit voltage and an external load may be connected to the fuel cell. The volume of the anode flow channel should be designed to be as small as possible to make the hydrogen/air and air/hydrogen fronts pass through the anode as quickly as possible to minimize stack damage.

Gas cross-over, especially oxidant gas cross-over from the cathode to the anode either through the membrane electrolyte or mostly commonly through leakage in the bipolar plates and edge seals, can trigger formation of local cells and electrode degradation during normal operation and startup/shutdown cycles. As the inventive fuel cell greatly reduces the oxygen reduction capacity and activity of the anode, the inventive fuel exhibits the feature of greater tolerance to gas cross-over. The fuel cell according to this invention therefore not only last for many startup and shutdown cycles, but also last for long hours of continuous operation.

EXAMPLE 1

TABLE 1

| Sample | Anode loading, mg/cm2 | Cathode loading, mg/cm2 | Anode BOL, m2/g | Anode EOL, m2/g | Cathode BOL, m2/g | Cathode EOL, m2/g | Degradation rate @0.2 A/cm2, µV/cycle | Degradation rate @0.8 A/cm2, µV/cycle |
|---|---|---|---|---|---|---|---|---|
| Gore MEA | 0.4 | 0.4 | 76.9 | 56.7 | 77 | 35.3 | 460 | >600 (failed) |
| In house MEA | 0.4 | 0.4 | 63.8 | 47.1 | 61.4 | 24.6 | 539 | >600 (failed) |
| In house MEA | 0.05 (50 wt. % Pt) | 0.4 | 68.5 | 52.6 | 60.2 | 22.5 | 225 | >600 (failed) |
| In house MEA | 0.05 (20 wt % Pt) | 0.4 | 90 | 85 | 64 | 53 | 28 | 47 |
| In house MEA | 0.05/50% Pt/GrC | 0.4 | 26.1 | 17.8 | 60 | 37.2 | 52 | 199 |

In this example, a membrane electrode assembly (MEA) was made by the decal approach, which is also known as the catalyst coated membrane (CCM) method. Inks were prepared using platinized carbons, where the carbon support was a mixture of Ketjen black and Vulcan XC-72 mixed in equal amounts. Ketjen black has a BET surface area of 900 m$^2$/g (75% of the BET surface area is mesopore area), a pH of about 8.8, and an average pore radius of 75 Å. Vulcan XC-72 carbon has a BET surface area of 251 m$^2$/g (about 52% of the BET surface area is mesopore area), a pH of about 6.2, and an average pore radius of 154 Å. In three of the four in-house experiments, both the anode and the cathode used the same mixed carbon support. To study the effect of a lower surface area support at the anode, platinum dispersed on graphitized Black Pearls carbon (BET surface area about 200 m$^2$/g) was investigated for a fourth in-house MEA experiment in this example.

The thin film MEA 12 was prepared by hot pressing the decals for the anode and the cathode on either side of a Nafion membrane. Toray diffusion medias were used to assemble the cell with the MEA. The MEA was conditioned under 100% relative humidity of inlet gases at the anode and the cathode at 80 C and 150 kPa pressure. After conditioning at 0.6 V, 0.85 V and open-circuit voltage, the Pt surface area was measured using the hydrogen adsorption method at 30 C. Then the hydrogen/air polarization curve was measured at 66% inlet gas RH, 80 C and 150 kPa. The cell voltage was measured at various constant current densities in the range 0.1-1.5 A/cm2.

Figure 6A:
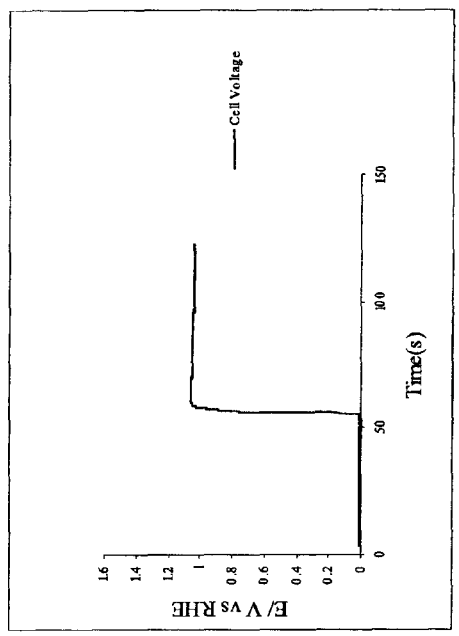
FIGS. 6A-C are graphs showing the cell, the anode and the cathode potential shifts of a conventional fuel cell during start-up. The cathode potential spike occurred within about 700 ms.
Figure 6B:
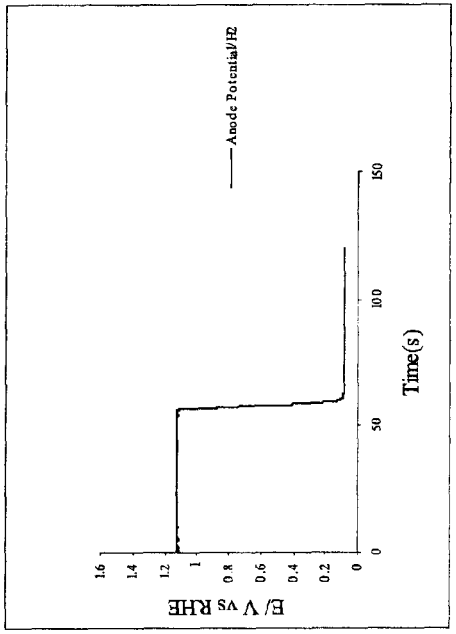
Figure 6C:
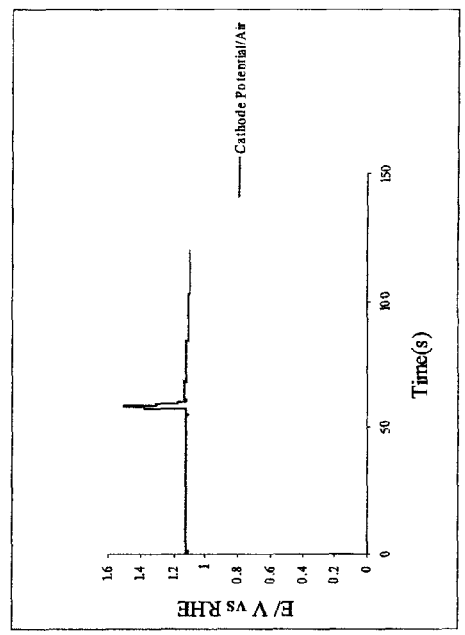
Figure 7B:
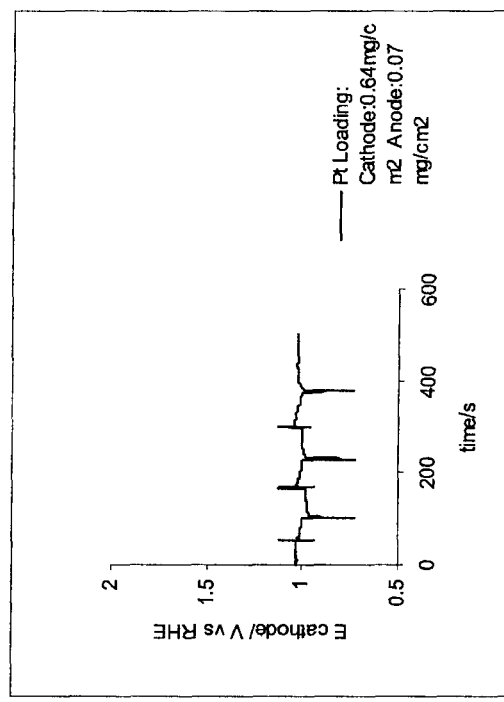
FIGS. 7A-B are graphs showing cathode potential shifts during startup and shutdown cycles of a conventional fuel cell and of a fuel cell according to one embodiment of the invention.
Figure 7A:
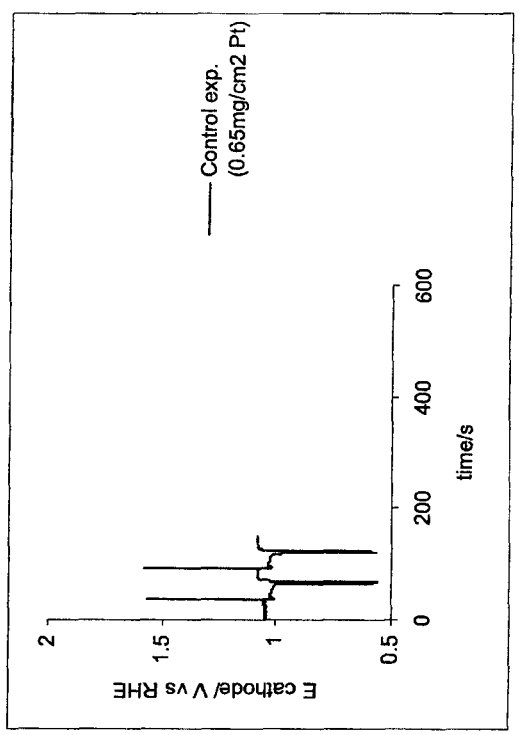

FIGS. 6A-C are graphs showing the cell, the anode and the cathode potential shifts of a conventional fuel cell during start-up. The cathode potential spike occurred within about 700 ms. FIGS. 7A-B are graphs showing cathode potential shifts during startup and shutdown cycles of a conventional fuel cell and of a fuel cell according to one embodiment of the invention. The MEAs for the reference electrode measurements shown in FIGS. 6A-C and 7A-B were prepared using the catalyst coated diffusion media (CCDM) method. In this method, a catalyst ink was prepared by mixing catalyzed carbon and a 5% NAFION solution (obtained from Solution Technology). The ink was thinned to the required extent using either 30% (weight percent) t-butanol or water. The catalyzed carbon was 50% platinum (Pt) catalyst dispersed on the Vulcan XC-72R carbon supplied by TKK (Tanaka Kikinzoku Kogyo Company) The NAFION content was varied in the range of 20-50%. The ink was then coated on a Toray carbon sheet to obtain the desired Pt loadings by brushing to make the anode and the cathode. The coating was then dried at 90°-95° C. for 30 minutes to remove the alcohol. Next, Nafion fiber probes were attached to the coated carbon sheets and the sheets were hot pressed to a Nafion 112 membrane at either 120° C. for 5 minutes or at 150° C. for 1 minute at a compressive load of 1000-2000 lb/in$^2$. This produced a thin film electrode at each of the two opposed, major surfaces of the membrane, and the electrodes were at least partially embedded into the membrane. The membrane electrode assembly (MEA) had an overall thickness of about 70-80 microns, excluding the carbon sheet diffusion medias, consistent with the thin film construction of the electrodes at least partially embedded in the membrane. The MEA exhibited only minor variation in membrane thickness, demonstrating that good adherence is achieved without any large variation in the thickness.

The resulting MEA has an anode thickness of about 5-10 μm, carbon particle size of 30 nm, cathode thickness of 10-15 μm. Pure hydrogen is used as the fuel gas and air is used as the oxidant gas.

Startup/shutdown tests were done with 50-cm$^2$ small scale cell and the results are listed in Table 1. For the shut down of the small scale cell, the cell load was first disconnected and the cathode air flow was stopped. Air was passed through the anode to purge the H2 out at 80° C. and 66% RH inlet condition. These inlet conditions were maintained at both the anode and cathode. The residence time of the air purge front was 0.26 second and there was no dummy load for preventing cell damage since this was an accelerated startup/shutdown test. Once the cell was filled with air at both the anode and the cathode, the shutdown procedure is complete. To start up the small scale cell, the fuel gas was passed through the anode while the cathode was filled with stagnant air and without any connection to a dummy load. The H$_2$/air front residence time was the same as for shutdown viz., 0.26 second. Once the air had been purged thoroughly out of the anode, and air was flowing to the cathode, the shutdown/startup procedure was complete. The cell was run for 1000 startup/shutdown cycles as described above and the cell voltage was measured before and after startup/shutdown cycles at 80° C., 66% inlet RH at both the anode and the cathode. The operating pressure was set at 150 kPa absolute during the cell voltage measurement. The average voltage degradation of the cell after startup/shutdown procedures was obtained by dividing the total cell voltage loss by 1000 startup/shutdown cycles.

Degradation of the fuel cell electrodes was measured by average cell voltage drop after 1000 startup/shutdown cycles when the fuel cell was operated at 0.2 A/cm$^2$ or 0.8 A/cm$^2$. The results are summarized in Table 1.

EXAMPLE 2

A CCM type MEA was prepared as described in example 1, except that platinum loading on the carbon support was further reduced from 50% by weight to 20% by weight. The anode Pt loading is an eighth of the loading at the cathode. Degradation of the fuel cell performance is measured and the results are summarized in table 1, row 4.

COMPARATIVE EXAMPLE A

Similar CCM type MEA was prepared as described in example 1, except that the Pt loading on the anode is 0.4 mg/cm$^2$, the same as that of the cathode. The anode thickness is about 10-15 μm and is the same as that of the cathode. The electrode degradation is measured in the same manner as described in example 1 and the results are reported in table 1. As can be seen from the results in table 1, row 2, such high catalyst loading on the anode contributed greatly to the degradation of the electrode during cell startup and shutdown cycles.

COMPARATIVE EXAMPLE B

A commercially available MEA was obtained from W.L. Gore, Gore 5510 MEA. The MEA has relatively high anode Pt loading, 0.4 mg/cm$^2$. The oxygen reduction capacity and activity is therefore high. As a result, electrode degradation of such fuel cell is significant, as shown in the degradation results in table 1, row 1.

COMPARATIVE EXAMPLE C

A CCM type MEA was prepared as described in example 1, except that the carbon support at the anode was a graphitized Black Pearls Carbon (GrC), and the carbon support at the cathode was the same mixed carbons. Platinum weight percent on the carbon support was the same at the anode and the cathode at 50% by weight. The anode Pt loading was only an eighth of the loading at the cathode and the reduction was achieved by reducing the anode thickness. Degradation of the fuel cell performance was measured and the results are summarized in table 1, row 5.

COMPARATIVE EXAMPLE D

Similar CCM type MEA was prepared as described in example 1, except that the Pt loading on the anode was 0.05 mg/cm2, which was achieved by reducing the thickness of the electrode. Cathode Pt loading was held constant and the catalyst supports were the same mixed carbon support at both the electrodes. Degradation of the fuel cell performance was measured and the results are summarized in table 1, row 3.

COMPARATIVE EXAMPLE E

A CCDM type fuel cell MEA is prepared according to the method described in example 1. In addition, this MEA had Nafion capillary probes attached to the electrode to monitor the local potential shifts during hydrogen and air purges at the anode. The fuel cell had an electrode area of about 9.6 cm$^2$, and a Pt loading of 0.9 mg/cm$^2$. Vulcan XC-72 carbon support and a 50 µm Nafion membrane were used. The cell was operated at 25° C. and normal atmospheric pressure using humidified gases. The anode had a hydrogen gas flow rate of 50 mL/min, and the cathode had an air flow rate of 300 mL/min. Saturated calomel electrodes were used as the external reference electrode.

Initially both the anode and the cathode were kept under humidied air flow at 300 mL/min to establish the open-circuit air/air potential at the MEA. To record the startup transient, air flow to the anode was stopped, and while the anode compartment was filled with stagnant air, hydrogen flow was introduced at 50 mL/min to purge air out of the anode. To record the shut down transient, hydrogen flow to the anode was stopped and with the anode filled with stagnant hydrogen, air flow was introduced at 300 mL/min to purge hydrogen out of the anode compartment. The potential-time response of the anode and the cathode during the gas purges at the anode were recorded.

The cathode potential, anode potential and cell voltage during cell startup are shown in FIGS. 6A-C. As shown clearly in FIGS. 6A-C, the cathode potential shifted up from 1.0V to about 1.5V within 700 milliseconds. Such high potential spike at the cathode during startup is responsible for electrode degradation. The high oxygen reduction capacity and activity due to high Pt loading on the anode are the key factors contributing to such high potential shift on the cathode. Also noted is the fast rate of such potential shift during startup. Because it is difficult to completely purge out residue gas in the flow field of a conventional fuel cell, fast purging alone will not resolve the electrode degradation problem during fuel cell startup and shutdown cycles.

EXAMPLE 3

Similar CCDM type MEA with a Nafion capillary probe attached to the cathode was prepared as described in example 1, except that the Pt loadings were 0.07 mg/cm$^2$ on the anode and 0.64 mg/cm$^2$ on the cathode. Carbon support for the anode and the cathode was Vulcan XC-72. Startup and shutdown procedures were the same as given above in Comparative Example D. MEA used 50 µm Nafion membrane and 9.6 cm$^2$ area electrodes. Gas flow rates were 50 mL/min. (hydrogen) and 300 mL/min (air). NAFION probe for the hydrogen reference electrode was located near the edge of the electrode.

COMPARATIVE EXAMPLE F

Similar CCDM type MEA was prepared as described in example 3 except that the Pt loadings on the anode and cathode are both 0.64 mg/cm$^2$.

As shown in FIGS. 7A-B, potential shift at the cathode of comparative example D during hydrogen purge at the anode was from 1.03 V to 1.57 V, compared to, from 1.03 V to 1.12 V, at the cathode of example 3 where the anode had a lower Pt loading by a factor of 9, an improvement of 450 mV. FIG. 7 also shows that when the anode is purged with air to remove hydrogen, the potential shift at the anode from 0.05 V to 1.0 V caused the cathode potential to shift lower, probably due to changes in the locations of local cells on the electrode. An improvement in the magnitude of the potential shifts is also observed during the air purge (from 1.01 V to 0.55 volt during air purge of hydrogen anode for the high Pt-loaded anode of comparative example D, compared to from 1.01V to 0.74 V for the low Pt-loaded anode of example 3, an improvement of 190 mV). Such an inversion in the potential shifts is also observed when probes are moved from near the edge to the center of the cathode during any gas purge (hydrogen or air) at the anode. A positive potential shift may indicate a carbon cell and a lower potential shift may indicate an oxygen reduction cell. This edge effect may be magnified by the high air flow rate used at the cathode, which may create oxygen-rich regions at the anode preferentially near the edges due to excess oxygen cross-over. Thus, locations of the carbon oxidation and oxygen reduction cells on the cathode during gas purges may depend on cell parameters, gas flow rates, gas cross-over rates and local potential variations at the electrode interphase.

The above description of embodiments of the invention is merely exemplary in nature and, thus, variations thereof are not to be regarded as a departure from the spirit and scope of the invention.

What is claimed is:

1. A method of starting up a fuel cell comprising:
providing a fuel cell comprising a membrane electrolyte having a first side, a second side, and a thickness; an anode over the first side of said membrane, a cathode over the second side of said membrane, an anode gas flow field and a cathode gas flow field, an oxidant gas residing in the flow fields of both the anode and the cathode, said anode having a thickness of less than about 10 µm and said cathode being at least twice as thick as said anode, said anode comprising a metal catalyst in an amount of about 0.02 to about 0.07 mg/cm$^2$ of the anode surface;
connecting said fuel cell anode to a fuel gas supply;
flowing a fuel gas through the flow field of said anode, the flow field of said anode having a ratio of anode flow field volume to anode electrode area that ranges from about 0.01 cm to 0.06 cm so that flowing the fuel gas through the flow field substantially replaces said oxidant gas, wherein i) the ratio of anode flow field volume to anode electrode area, ii) the thickness of said anode and said cathode, or iii) the amount of said metal catalyst of said anode or any combination of i, ii, and iii, provide a potential increase on the cathode during such gas change that is no more than about 0.1V in order to reduce electrode degradation;
connecting said fuel cell cathode to an oxidant gas supply; and
connecting said fuel cell to an external load.

2. A method of starting up a fuel cell as set forth in claim 1, wherein said fuel gas is hydrogen and said oxidant gas is air.

3. A method of starting up a fuel cell as set forth in claim 2, wherein said anode comprises a catalyst support having a BET surface area of about 200 m$^2$/g or less.

4. A method of shutting down a fuel cell comprising:
providing a fuel cell comprising a membrane electrolyte, having a first side, a second side, and a thickness; an anode attached to the first side of said membrane, a cathode attached to the second side of said membrane, an oxidant gas flowing over the surfaces of said cathode through a defined cathode flow field and a fuel gas flowing over the surface of said anode in a defined anode flow field, said anode having a thickness of less than about 10 μm and said cathode being at least twice as thick as said anode, said anode comprising a metal catalyst in an amount of about 0.02 to about 0.07 mg/cm$^2$ of the anode surface;
disconnecting a fuel gas supply from said fuel cell; and
flowing said oxidant gas to the flow field of said anode, the flow field of said anode having a ratio of anode flow field volume to anode electrode area that ranges from about 0.01 cm to 0.06 cm so that flowing said oxidant gas through the flow field substantially replaces said fuel gas, wherein i) the ratio of anode flow field volume to anode electrode area, ii) the thickness of said anode and said cathode, or iii) the amount of said metal catalyst of said anode or any combination of i, ii, and iii, provide a potential increase on the cathode during such gas change that is no more than about 0.26V in order to reduce electrode degradation.

5. A method of shutting down a fuel cell as set forth in claim 4, wherein said fuel gas is hydrogen and said oxidant gas is air.

6. A method of shutting down a fuel cell as set forth in claim 4, wherein said anode comprises a catalyst support having a BET surface area of about 200 m$^2$/g or less.

7. A method of shutting down a fuel cell comprising:
providing a fuel cell comprising a membrane electrolyte, having a first side, a second side, and a thickness; an anode attached to the first side of said membrane, a cathode attached to the second side of said membrane, an oxidant gas flowing over the surfaces of said cathode through a defined cathode flow field and a fuel gas flowing over the surface of said anode in a defined anode flow field, said anode having a thickness of less than about 10 μm and said cathode being at least twice as thick as said anode, said anode comprising a metal catalyst in an amount of about 0.02 to about 0.07 mg/cm$^2$ of the anode surface;
disconnecting a fuel gas supply from said fuel cell; and
flowing said oxidant gas to the flow field of said anode, the flow field of said anode having a ratio of anode flow field volume to anode electrode area that ranges from about 0.01 cm to 0.06 cm so that flowing said oxidant gas through the flow field substantially replaces said fuel gas, wherein the ratio of anode flow field volume to anode electrode area provides a potential increase on the cathode during such gas change that is no more than about 0.1V in order to reduce electrode degradation.

8. A method of shutting down a fuel cell comprising:
providing a fuel cell comprising a membrane electrolyte, having a first side, a second side, and a thickness; an anode attached to the first side of said membrane, a cathode attached to the second side of said membrane, an oxidant gas flowing over the surfaces of said cathode through a defined cathode flow field and a fuel gas flowing over the surface of said anode in a defined anode flow field, said anode having a thickness of less than about 10 μm and said cathode being at least twice as thick as said anode, said anode comprising a metal catalyst in an amount of about 0.02 to about 0.07 mg/cm$^2$ of the anode surface;
disconnecting a fuel gas supply from said fuel cell; and
flowing said oxidant gas to the flow field of said anode, the flow field of said anode having a ratio of anode flow field volume to anode electrode area that ranges from about 0.01 cm to 0.06 cm so that flowing said oxidant gas through the flow field substantially replaces said fuel gas, wherein the thickness of said anode and said cathode provides a potential increase on the cathode during such gas change that is no more than about 0.1V in order to reduce electrode degradation.

9. A method of shutting down a fuel cell comprising:
providing a fuel cell comprising a membrane electrolyte, having a first side, a second side, and a thickness; an anode attached to the first side of said membrane, a cathode attached to the second side of said membrane, an oxidant gas flowing over the surfaces of said cathode through a defined cathode flow field and a fuel gas flowing over the surface of said anode in a defined anode flow field, said anode having a thickness of less than about 10 μm and said cathode being at least twice as thick as said anode, said anode comprising a metal catalyst in an amount of about 0.02 to about 0.07 mg/cm$^2$ of the anode surface;
disconnecting a fuel gas supply from said fuel cell; and
flowing said oxidant gas to the flow field of said anode, the flow field of said anode having a ratio of anode flow field volume to anode electrode area that ranges from about 0.01 cm to 0.06 cm so that flowing said oxidant gas through the flow field substantially replaces said fuel gas, wherein the amount of said metal catalyst of said anode provides a potential increase on the cathode during such gas change that is no more than about 0.1V in order to reduce electrode degradation.

10. A method of shutting down a fuel cell comprising:
providing a fuel cell comprising a membrane electrolyte, having a first side, a second side, and a thickness; an anode attached to the first side of said membrane, a cathode attached to the second side of said membrane, an oxidant gas flowing over the surfaces of said cathode through a defined cathode flow field and a fuel gas flowing over the surface of said anode in a defined anode flow field, said anode having a thickness of less than about 10 μm and said cathode being at least twice as thick as said anode, said anode comprising a metal catalyst in an amount of about 0.02 to about 0.07 mg/cm$^2$ of the anode surface;
disconnecting a fuel gas supply from said fuel cell; and
flowing said oxidant gas to the flow field of said anode, the flow field of said anode having a ratio of anode flow field volume to anode electrode area that ranges from about 0.01 cm to 0.06 cm so that flowing said oxidant gas through the flow field substantially replaces said fuel gas, wherein at least two of i) the ratio of anode flow field volume to anode electrode area, ii) the thickness of said anode and said cathode, or iii) the amount of said metal catalyst of said anode provide a potential increase on the cathode during such gas change that is no more than about 0.1V in order to reduce electrode degradation.

11. A method of shutting down a fuel cell comprising:
providing a fuel cell comprising a membrane electrolyte, having a first side, a second side, and a thickness; an anode attached to the first side of said membrane, a cathode attached to the second side of said membrane, an oxidant gas flowing over the surfaces of said cathode through a defined cathode flow field and a fuel gas flowing over the surface of said anode in a defined anode flow field, said anode having a thickness of less than about 10 μm and said cathode being at least twice as thick as said anode, said anode comprising a metal catalyst in an amount of about 0.02 to about 0.07 mg/cm$^2$ of the anode surface;

disconnecting a fuel gas supply from said fuel cell; and flowing said oxidant gas to the flow field of said anode, the flow field of said anode having a ratio of anode flow field volume to anode electrode area that ranges from about 0.01 cm to 0.06 cm so that flowing said oxidant gas through the flow field substantially replaces said fuel gas, wherein the ratio of anode flow field volume to anode electrode area provides a potential increase on the cathode during such gas change that is no more than about 0.26V in order to reduce electrode degradation.

12. A method of shutting down a fuel cell comprising:

providing a fuel cell comprising a membrane electrolyte, having a first side, a second side, and a thickness; an anode attached to the first side of said membrane, a cathode attached to the second side of said membrane, an oxidant gas flowing over the surfaces of said cathode through a defined cathode flow field and a fuel gas flowing over the surface of said anode in a defined anode flow field, said anode having a thickness of less than about 10 μm and said cathode being at least twice as thick as said anode, said anode comprising a metal catalyst in an amount of about 0.02 to about 0.07 mg/cm$^2$ of the anode surface;

disconnecting a fuel gas supply from said fuel cell; and flowing said oxidant gas to the flow field of said anode, the flow field of said anode having a ratio of anode flow field volume to anode electrode area that ranges from about 0.01 cm to 0.06 cm so that flowing said oxidant gas through the flow field substantially replaces said fuel gas, wherein the thickness of said anode and said cathode provides a potential increase on the cathode during such gas change that is no more than about 0.26V in order to reduce electrode degradation.

13. A method of shutting down a fuel cell comprising:

providing a fuel cell comprising a membrane electrolyte, having a first side, a second side, and a thickness; an anode attached to the first side of said membrane, a cathode attached to the second side of said membrane, an oxidant gas flowing over the surfaces of said cathode through a defined cathode flow field and a fuel gas flowing over the surface of said anode in a defined anode flow field, said anode having a thickness of less than about 10 μm and said cathode being at least twice as thick as said anode, said anode comprising a metal catalyst in an amount of about 0.02 to about 0.07 mg/cm$^2$ of the anode surface;

disconnecting a fuel gas supply from said fuel cell; and flowing said oxidant gas to the flow field of said anode, the flow field of said anode having a ratio of anode flow field volume to anode electrode area that ranges from about 0.01 cm to 0.06 cm so that flowing said oxidant gas through the flow field substantially replaces said fuel gas, wherein the amount of said metal catalyst of said anode provides a potential increase on the cathode during such gas change that is no more than about 0.26V in order to reduce electrode degradation.

14. A method of shutting down a fuel cell comprising:

providing a fuel cell comprising a membrane electrolyte, having a first side, a second side, and a thickness; an anode attached to the first side of said membrane, a cathode attached to the second side of said membrane, an oxidant gas flowing over the surfaces of said cathode through a defined cathode flow field and a fuel gas flowing over the surface of said anode in a defined anode flow field, said anode having a thickness of less than about 10 μm and said cathode being at least twice as thick as said anode, said anode comprising a metal catalyst in an amount of about 0.02 to about 0.07 mg/cm$^2$ of the anode surface;

disconnecting a fuel gas supply from said fuel cell; and flowing said oxidant gas to the flow field of said anode, the flow field of said anode having a ratio of anode flow field volume to anode electrode area that ranges from about 0.01 cm to 0.06 cm so that flowing said oxidant gas through the flow field substantially replaces said fuel gas, wherein at least two of i) the ratio of anode flow field volume to anode electrode area, ii) the thickness of said anode and said cathode, or iii) the amount of said metal catalyst of said anode provide a potential increase on the cathode during such gas change that is no more than about 0.26V in order to reduce electrode degradation.

* * * * *